(12) United States Patent
Sundar

(10) Patent No.: US 11,736,491 B2
(45) Date of Patent: *Aug. 22, 2023

(54) VIRTUAL REALITY AUTHENTICATION

(71) Applicant: EBAY INC., San Jose, CA (US)

(72) Inventor: Nataraj Agaram Sundar, San Jose, CA (US)

(73) Assignee: EBAY INC., San Jose, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/320,894

(22) Filed: May 14, 2021

(65) Prior Publication Data
US 2021/0273944 A1 Sep. 2, 2021

Related U.S. Application Data

(63) Continuation of application No. 16/002,660, filed on Jun. 7, 2018, now Pat. No. 11,050,752.

(51) Int. Cl.
*H04L 9/40* (2022.01)
*H04W 12/06* (2021.01)
(Continued)

(52) U.S. Cl.
CPC ............ *H04L 63/102* (2013.01); *G06F 21/36* (2013.01); *H04L 63/08* (2013.01);
(Continued)

(58) Field of Classification Search
CPC ...... G06F 21/36; G06F 3/011; G06F 3/04815; H04W 12/06; H04W 12/00508;
(Continued)

(56) References Cited

U.S. PATENT DOCUMENTS 7,971,156 B2 6/2011 Albertson et al.
9,092,600 B2 7/2015 Scavezze et al.
(Continued)

FOREIGN PATENT DOCUMENTS

EP 2887253 A1 6/2015
EP 3239878 A1 11/2017
(Continued)

OTHER PUBLICATIONS

D. Gupta, A. P. Singh, V. Goar and S. Mathur, "Combination of textual and graphical based authentication scheme through virtual environment," 2017 3rd International Conference on Advances in Computing,Communication & Automation (ICACCA) (Fall), Dehradun, India, 2017, pp. 1-4. (Year: 2017).*
(Continued)

*Primary Examiner* — Kari L Schmidt
(74) *Attorney, Agent, or Firm* — Shook, Hardy & Bacon LLP

(57) ABSTRACT

Systems and methods for authenticating users in three-dimensional environments are described. In some embodiments, a virtual object and three-dimensional environment are transmitted. Virtual motion data of the virtual object is received. The received virtual motion data is compared against a pattern. Based on the comparison of the patterns, a device is authorized to access a resource. In some embodiments, a pattern may be extracted from the received virtual motion data.

20 Claims, 9 Drawing Sheets

(51) Int. Cl.
    *G06F 21/36*      (2013.01)
    *G06F 3/01*      (2006.01)
    *G06Q 30/0601*      (2023.01)
    *G06F 3/04815*      (2022.01)

(52) U.S. Cl.
    CPC ......... *H04L 63/0876* (2013.01); *H04W 12/06* (2013.01); *G06F 3/011* (2013.01); *G06F 3/04815* (2013.01); *G06Q 30/0643* (2013.01)

(58) Field of Classification Search
    CPC .... H04W 12/68; H04L 63/08; H04L 63/0876; H04L 63/102
    See application file for complete search history.

(56) References Cited

U.S. PATENT DOCUMENTS

| | | |
|---|---|---|
| 9,153,074 B2 | 10/2015 | Zhou et al. |
| 9,330,272 B2 | 5/2016 | Koo |
| 9,565,176 B2 | 2/2017 | Goyal |
| 9,947,012 B2 | 4/2018 | Smith et al. |
| 10,645,092 B1 | 5/2020 | Bonar et al. |
| 11,050,752 B2 | 6/2021 | Sundar |
| 11,429,939 B1* | 8/2022 | Borunda ............ H04L 63/0861 |
| 2005/0177428 A1 | 8/2005 | Ganz |
| 2011/0047600 A1 | 2/2011 | Johnson et al. |
| 2014/0096196 A1* | 4/2014 | O'Connor ............ G06F 21/36 726/17 |
| 2014/0125574 A1* | 5/2014 | Scavezze ............ G06F 21/34 345/156 |
| 2014/0310056 A1 | 10/2014 | Alapati et al. |
| 2015/0143487 A1 | 5/2015 | Nathan et al. |
| 2015/0235267 A1 | 8/2015 | Steube et al. |
| 2015/0309705 A1 | 10/2015 | Keeler et al. |
| 2015/0365236 A1* | 12/2015 | Kim ............ G06F 21/31 726/18 |
| 2016/0140553 A1 | 5/2016 | Faith et al. |
| 2016/0188861 A1 | 6/2016 | Todeschini |
| 2017/0178410 A1 | 6/2017 | Sugden et al. |
| 2017/0244811 A1 | 8/2017 | Mckenzie et al. |
| 2017/0264945 A1 | 9/2017 | Depies et al. |
| 2017/0316186 A1 | 11/2017 | Breitenfeld et al. |
| 2017/0364920 A1 | 12/2017 | Anand |
| 2018/0060606 A1 | 3/2018 | Dascola et al. |
| 2018/0060683 A1 | 3/2018 | Kontsevich et al. |
| 2018/0150831 A1 | 5/2018 | Dolan et al. |
| 2018/0157820 A1 | 6/2018 | Adams et al. |
| 2018/0158060 A1 | 6/2018 | Adams et al. |
| 2018/0285538 A1* | 10/2018 | Zhu ............ G06F 21/31 |
| 2018/0323972 A1 | 11/2018 | Reed et al. |
| 2019/0044989 A1 | 2/2019 | Veeramani et al. |
| 2019/0050547 A1 | 2/2019 | Welsh et al. |
| 2019/0354669 A1* | 11/2019 | Brantley ............ G06F 21/36 |
| 2019/0379671 A1 | 12/2019 | Sundar |
| 2020/0104522 A1 | 4/2020 | Collart |
| 2020/0228524 A1* | 7/2020 | Szafranski ............ A63F 13/71 |
| 2020/0249819 A1 | 8/2020 | Berquam et al. |
| 2020/0356171 A1 | 11/2020 | Furman et al. |
| 2021/0026441 A1* | 1/2021 | Spivack ............ G06Q 30/0601 |
| 2021/0089639 A1* | 3/2021 | Remillet ............ G06F 21/32 |
| 2022/0129882 A1* | 4/2022 | Spender ............ G07F 7/1041 |

FOREIGN PATENT DOCUMENTS

| | | |
|---|---|---|
| WO | 2016/183541 A1 | 11/2016 |
| WO | 2017/164584 A1 | 9/2017 |
| WO | 2018/194518 A1 | 10/2018 |
| WO | 2019/236650 A1 | 12/2019 |

OTHER PUBLICATIONS

Roesner, Franziska, Tadayoshi Kohno, and David Molnar. "Security and privacy for augmented reality systems." Communications of the ACM 57.4 (2014): 88-96. (Year: 2014).*

R. Iglesias, M. Orozco, F. A. Alsulaiman, J. J. Valdes and A. El Saddik, "Characterizing biometric behavior through haptics and Virtual Reality," 2008 42nd Annual IEEE International Carnahan Conference on Security Technology, Prague, Czech Republic, 2008, pp. 174-179. (Year: 2008).*

Final Office Action Received for U.S. Appl. No. 16/002,660, dated Jul. 15, 2020, 28 Pages.

Non Final Office Action Received for U.S. Appl. No. 16/002,660, dated Mar. 6, 2020, 28 Pages.

Non-Final Office Action Received for U.S. Appl. No. 16/002,660, dated Nov. 12, 2020, 30 pages.

Notice of Allowance Received for U.S. Appl. No. 16/002,660, dated Mar. 4, 2021,12 pages.

Lohr et al., "An implementation of eye movement-driven biometrics in virtual reality", Proceedings of the 2018 ACM Symposium on Eye Tracking Research & Applications 2018, p. 1-3.

International Preliminary Report on Patentability received for PCT Application No. PCT/US2019/035490, dated Dec. 17, 2020, 8 pages.

International Search Report received for PCT Application No. PCT/US2019/035490, dated Aug. 6, 2019, 3 pages.

Written Opinion received for PCT Application No. PCT/US2019/035490, dated Aug. 6, 2019, 6 pages.

Pfeuffer et al., "Behavioural biometrics in vr: Identifying people from body motion and relations in virtual reality", Proceedings of the 2019 CH I Conference on Human Factors in Computing Systems, 2019, pp. 1-12.

Wei et al., "Research and Application of Access Control Technique in 3D Virtual Reality System OpenSim", 2013 Sixth International Symposium on Computational Intelligence and Design, Hangzhou, China, 2013, pp. 65-68.

Yu et al., "An exploration of usable authentication mechanisms for virtual reality systems", 2016 IEEE Asia Pacific Conference on Circuits and Systems (APCCAS), Jeju, Korea (South), 2016, pp. 458-460.

* cited by examiner

VIRTUAL REALITY AUTHENTICATION

CROSS-REFERENCE TO RELATED APPLICATIONS

This application is a continuation of and claims the benefit of priority to U.S. patent application Ser. No. 16/002,660, filed Jun. 7, 2018, the benefit of priority of which is claimed hereby, and which is incorporated by reference herein in its entirety.

TECHNICAL FIELD

Embodiments of the present disclosure relate generally to computing systems, more particularly, but not by way of limitation, to controlling access, by a client computing device, to a computing server.

BACKGROUND

Mixed reality computing technologies, such as virtual reality and augmented reality computing, may enable users to use immersive simulated three-dimensional environments as a primary mode for interfacing with computing systems. A user of a mixed reality computing device may generate, access, and process data on a computing device using simulated objects analogously to ways that these computing operations are be performed using physical devices such as keyboards, pointer devices, and display terminals in traditional computing paradigms. Such a user may, for example, access a network-based market place server to browse, manipulate, and select items for purchase while in an immersive simulated three-dimensional environment without having to interrupt the immersive experience to access a computer keyboard or a computer mouse. While some general computer interfacing operations have blended well with the immersive simulated three-dimensional environments made possible by the development of mixed reality computing technologies, operations to authenticate a user, or a client computing device, to a server have not been integrated as seamlessly into these environments by these technologies.

BRIEF DESCRIPTION OF THE DRAWINGS

Various ones of the appended drawings merely illustrate example embodiments of the present disclosure and cannot be considered as limiting its scope.

Figure 1:
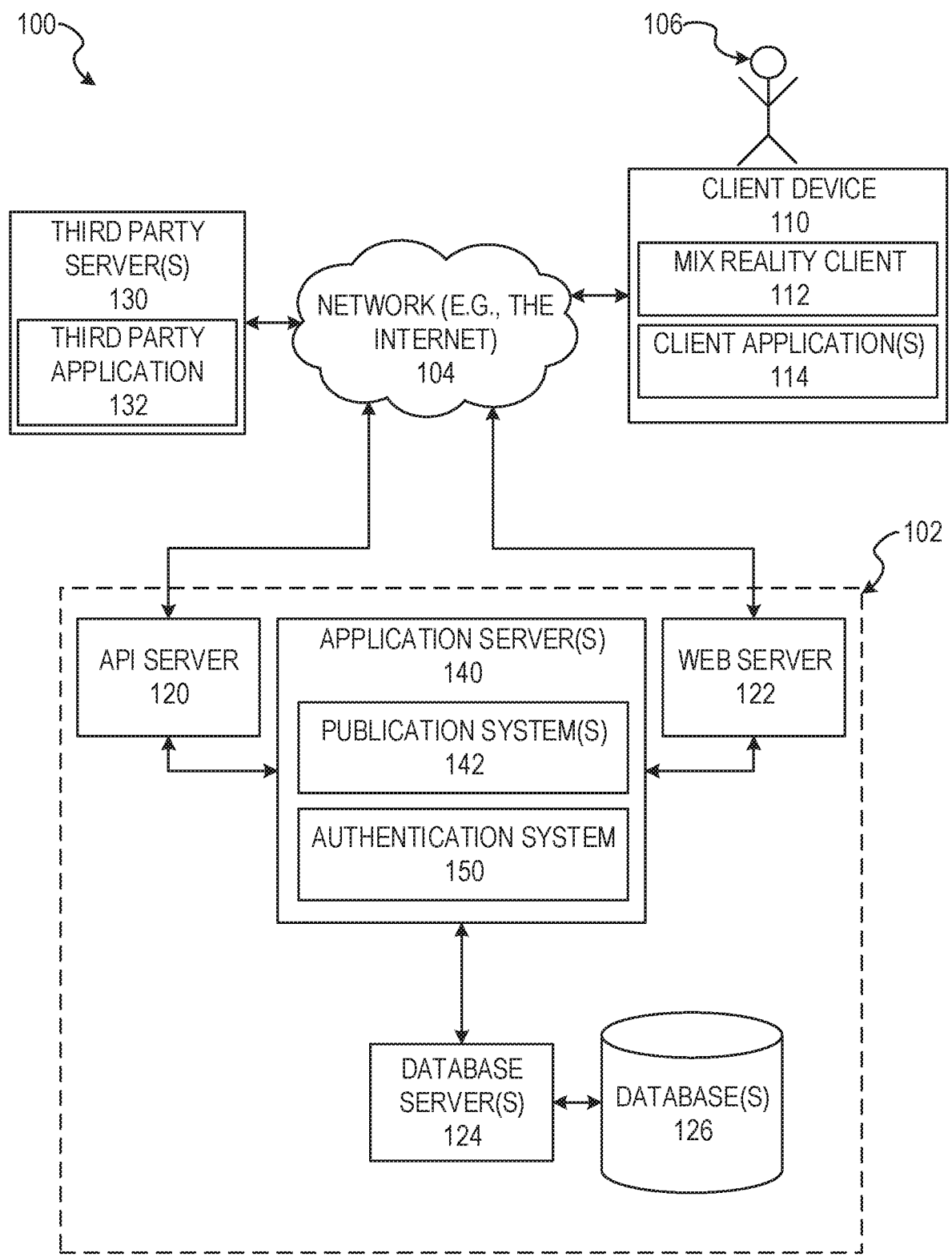
FIG. 1 is a diagram illustrating an example of a network-based system for controlling access, by a client computing device, to a computing server in an immersive simulated three-dimensional environment, according to various embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Authenticating a transaction in an immersive simulated three-dimensional environment (hereinafter, "immersive simulated environment") typically caused an interruption to the immersive simulated environment experience, such as to enable a user to interact with physical devices for providing authentication information to a computer system hosting the immersive simulated environment. As an example, a mixed reality device may include one or more sensors to track the movements of the eyes, head, arms, or legs of user to generate an immersive simulated environment that enables a user to browse, manipulate, and add items (e.g., three-dimensional models of items) to an electronic shopping cart in mixed reality enabled network-based market place (hereinafter, "network-based market place"). This immersive simulated environment-based shopping experience, however, may be interrupted when a user wants to authenticate a transaction, such as purchasing items in the shopping cart or saving selected items to an electronic account associated with the user. Such interruptions may be caused by the user having to disengage from a mixed reality device (e.g., virtual reality headset) to retrieve and operate a physical keyboard or computer mouse to provide authenticating credentials, such as a username and password, to a computing server hosting the network-based market place. In addition to interrupting the immersive simulated environment-based shopping experience, authentication techniques such as the username-password technique may expose the authenticating information of a user to third parties (e.g., eavesdroppers) who may be able to observe the interaction of the user with a physical keyboard. These authentication techniques may also require the use of long or obfuscated usernames or passwords that may not be secure, and which may be difficult for a user to remember.

Authentication techniques that integrate a portion of the authentication process into immersive simulated environments may rely on a mixed reality device for determining, generating, and rendering the authentication interface to the simulated environments. These techniques may limit the ability of computing systems that host virtual locations (e.g., virtual venue or domain in an immersive simulated environment) to customize the authentication experience, such as by determining the authentication environment or scene used to retrieve authentication information for accessing a virtual location. Some mixed reality devices try to address this limitation by allocating space to store custom authentication environments locally on the device. This solution, however, may increase the resources requirements and costs of a mixed reality device, such as by requiring a mixed reality device to have an increased storage capacity to store disparate authentication environments, additional software modules to interface with the disparate authentication environments, and increased memory and hardware processing power to process and render the authentication environments. This solution may make it difficult for a computing system hosting a virtual location to update authentication environments that are stored on a distributed set of mixed reality devices. This difficulty may result in disparities in the authentication experience provided by a virtual location, such as when an update is that changes a look or feel of the authentication environment is provided to some mixed reality devices but not others. This difficulty may also result in security vulnerabilities, such as when an update that addresses a discovered security flaw in the authentication environment provided by a virtual location is distributed to some mixed reality devices but not others.

Embodiments of the present disclosure overcome deficiencies in the previously mentioned authentication techniques by providing a server-based authentication technique (e.g., a method, system, and computer readable storage medium) that may be integrated into an immersive simulated environment, such as to authenticate a user or a client computing device (hereinafter, "client device"), such as a mixed reality device, at a server without interrupting the immersive simulated environment experience (hereinafter, "immersive experience"). According to this technique, a server may receive a unique identifier, such as in an electronic cookie or other data structure, from a client device, such as a mixed reality device. In some embodiments, the unique identifier may be received in a request to access a computing resource provided by the server. The computing resource may be any server-based computing resource, such as an item checkout or purchasing service, or another immersive simulated environment. The server may use the unique identifier to identify a stored virtual object associated with the user or the client device. The stored virtual object may include one or more simulated objects for authenticating the user or the client device an immersive simulated environment, such as three-dimensional (3D) model of a physical object, a geometric or organic shape, or a purchased item. The server may transmit the virtual object and an immersive simulated environment to the client device. The server may then receive authentication information from the client device. Such authentication information may include virtual motion data of a virtual movement of a virtual object relative to the immersive simulated environment. The server may determine, using the received authentication information (e.g., the virtual motion data), whether the client device is authorized to access the requested computing resource. The server may transmit an authorization message to the client device when the client device is authorized to access the requested computing resource.

According to various embodiments, the server-based authentication technique may reduce the likelihood that a third party may discover the authentication information of a user by observing the user or client authentication process. As an example, since the authentication information includes virtual motion data of a virtual movement of a virtual object relative to an immersive simulated environment, a third-party observer who does not have access to the immersive simulated environment may not be able to discover which virtual object is being manipulated or the manner in which the virtual object is manipulated relative to the immersive simulated environment. This technique may therefore provide an environment for authenticating a client device to a server that is more secure than authentication environments provided by other authentication techniques.

According to various embodiments, the server-based authentication technique described in the present disclosure may enable a client device to be authenticated to a server using authentication information that is not prescribed by strict rules regarding the length or content of the authentication information. Such authentication information may be easier for a user to remember than the username-password information provided by other authentication techniques. As an example, the server-based authentication technique of the present disclosure may enable a client device to be authenticated to a server using virtual motion data indicating a virtual movement of a virtual object relative to an immersive simulated environment rendered by a client device. Both the virtual object and the virtual movement of the virtual object may be preselected by a user of client device, such as according to any process that may cause the virtual object and the virtual movement to be easily remembered by the user, and stored on a server, such as part of registration process. Such a registration process may also cause the server to store a unique identifier on the client device, such as to cause the unique identifier to be automatically transferred to the server during an authentication process.

According to various embodiments, the server-based authentication technique described in the present disclosure may reduce the computing resource requirements of a client device while increasing the capacity of the client device to provide disparate authentication experiences for one or more virtual locations. As an example, an authentication environment including a virtual object and an immersive simulated environment may be generated or stored on a server hosting a virtual location. The authentication environment may then be transmitted to a client device, such as part of an authentication process. This server-based technique may reduce the storage requirements of a client device, such as by reducing the amount of data a client device stores locally to provide disparate authentication experiences. This technique may also, for similar reasons, reduce memory and processing requirements of a client device.

According to various embodiments, the server-based authentication technique described in the present disclosure may additionally enable computing systems that host one or more virtual locations to provide updated or changed authentication environments to one or more client device as desired. As an example, an authentication environment may be updated on a computing system that host a virtual location and the provided to a client device after, or in response to, a subsequently arriving request to access a computing resource of the computing system.

As used herein, the term immersive simulated environment may refer to a computing environment where at least a portion of the environment is simulated, such as to include one or more computer generated 3D objects, such as to enable a user immersed in the immersive simulated environment to interact (e.g., manipulate, rotate, translate, etc.) with the computer-generated 3D objects as if they were real objects. Accordingly, an immersive simulated environment may include an augmented reality environment or a virtual reality environment.

As used herein an authentication environment may be an immersive simulated environment generated to receive authentication information from a user or a client device. An authentication environment may include one or more virtual objects that may be virtually manipulated by a user to provide or generate authentication information.

As used virtual movement may be a movement or a gesture in an immersive simulated environment as perceived by an entity observing or interacting with the immersive simulated environment.

With reference to FIG. 1, an example embodiment of a high-level client-server-based network architecture 100, including a network-based system 102 (e.g., a network-based marketplace) for controlling access, by a client device 110 (e.g., a mixed reality device), to a computing server in an immersive simulated environment is shown. The networked system 102, in the example forms of a network-based marketplace or payment system, provides server-side functionality via a network 104 (e.g., the Internet or wide area network (WAN)) to one or more client devices 110. FIG. 1 illustrates, for example, a mixed reality client 112, and an application 114 executing on client device 110.

The client device 110 may comprise, but are not limited to, desktop computer, laptop, smart phones, tablets, ultra-books, netbooks, laptops, multi-processor systems, microprocessor-based or programmable consumer electronics, game consoles, set-top boxes, or any other communication device that a user may utilize to access the networked system 102. As an example, the client device 110 may include one or more mixed reality devices (e.g., mixed reality computing devices), as described herein. In some embodiments, the client device 110 may comprise a display module (not shown) to display information (e.g., in the form of user interfaces). In further embodiments, the client device 110 may comprise one or more of a touch screens, virtual or augmented reality headsets, accelerometers, gyroscopes, cameras, microphones, global positioning system (GPS) devices, physical positioning sensors (e.g., sensors for determining a physical user gesture, such as pointing at an object), 3D graphics processing devices (e.g., a graphics processor, co-processor, or accelerator), and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. In some embodiments, the network-based system 102 may be rendered as an immersive simulated environment where the product listings include renderings of 3D models of the products offered in the network-based marketplace. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., motion or gesture input) to the client device 110 and the input is communicated to the networked system 102 via the network 104. In this instance, the networked system 102, in response to receiving the input from the user, communicates information to the client device 110 via the network 104 to be presented to the user. In this way, the user may interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third-party application 132, executing on third party server(s) 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The authentication system 150 may provide functionality operable to perform various client device, or user, authentication operations. For example, the authentication system 150 may receive a unique identifier from a client device 110, the databases 126, the third-party servers 130, the publication system 142, and other sources. In some example embodiments, the authentication system 150 may determine, using the unique identifier, a virtual object and an immersive simulated environment for authenticating a client device. In some example embodiments, the authentication system 150 may then transmit the virtual object and an immersive simulated environment (e.g., an immersive simulated authentication environment) to the client device 110. In some example embodiments, the authentication system 150 may receive authenticating information, such as virtual motion data of a virtual movement of the virtual object relative to the immersive simulated environment, from the client device 110 and use this authentication information to determine whether the client device is authorized to access a computing resource provided by the authentication system or the network-based system 102. In some example embodiments, the authentication system 150 may communicate with the publication systems (e.g., to authorize access to a user account) and payment system 142. In an alternative embodiment, the authentication server 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The mixed reality client 112 may access the various publication and payment systems 142 and 150 via the web interface supported by the web server 122. More specifically, the mixed reality client 112 may interface with the web server 122 to render a virtual location in, for example, a virtual mall in an immersive simulated environment. The virtual location may be an embodiment of a network-based marketplace configured to provide 3D models of items offered for sale, such as items provided by the publication system 142. The mixed reality client 112 may receive user gesture information from one or more sensors associated with the client device 110, such as to enable a user to interact with 3D models offered items in an immersive simulated environment. The mixed reality client 112 may further interface with the authentication system 150, such as to automatically transmit, as part of a request of a user 106 to access a computing resource (e.g., a user account or purchasing resources) of the authentication system 150 or the network-based marketplace 102, a unique identifier associated with the user 106 or the client device 110. The mixed reality client 112 may receive, in response to the access request, a data structure that includes, or indicates, a virtual object and an immersive authentication environment (hereinafter, "authentication environment") for authenticating the user 106. The mixed reality client 112 may render the authentication environment and receive form a user, such as through one or more sensors associated with the client device 110, virtual motion data of a virtual movement of a virtual object relative to the immersive simulated environment. Such virtual motion data may indicative of authentication information of the user 106 or client device 110. The mixed reality client 112 may then transmit the virtual motion data to authentication system 150. In response to receiving an authentication message from the authentication server 150, the mixed reality client 112 may enable the user 106 execute operations with respect to the requested computing resource.

Additionally, a third-party application(s) 128, executing on a third-party server(s) 130, is shown as having programmatic access to the networked system 102 via the programmatic interface provided by the API server 120. For example, the third-party application 128, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
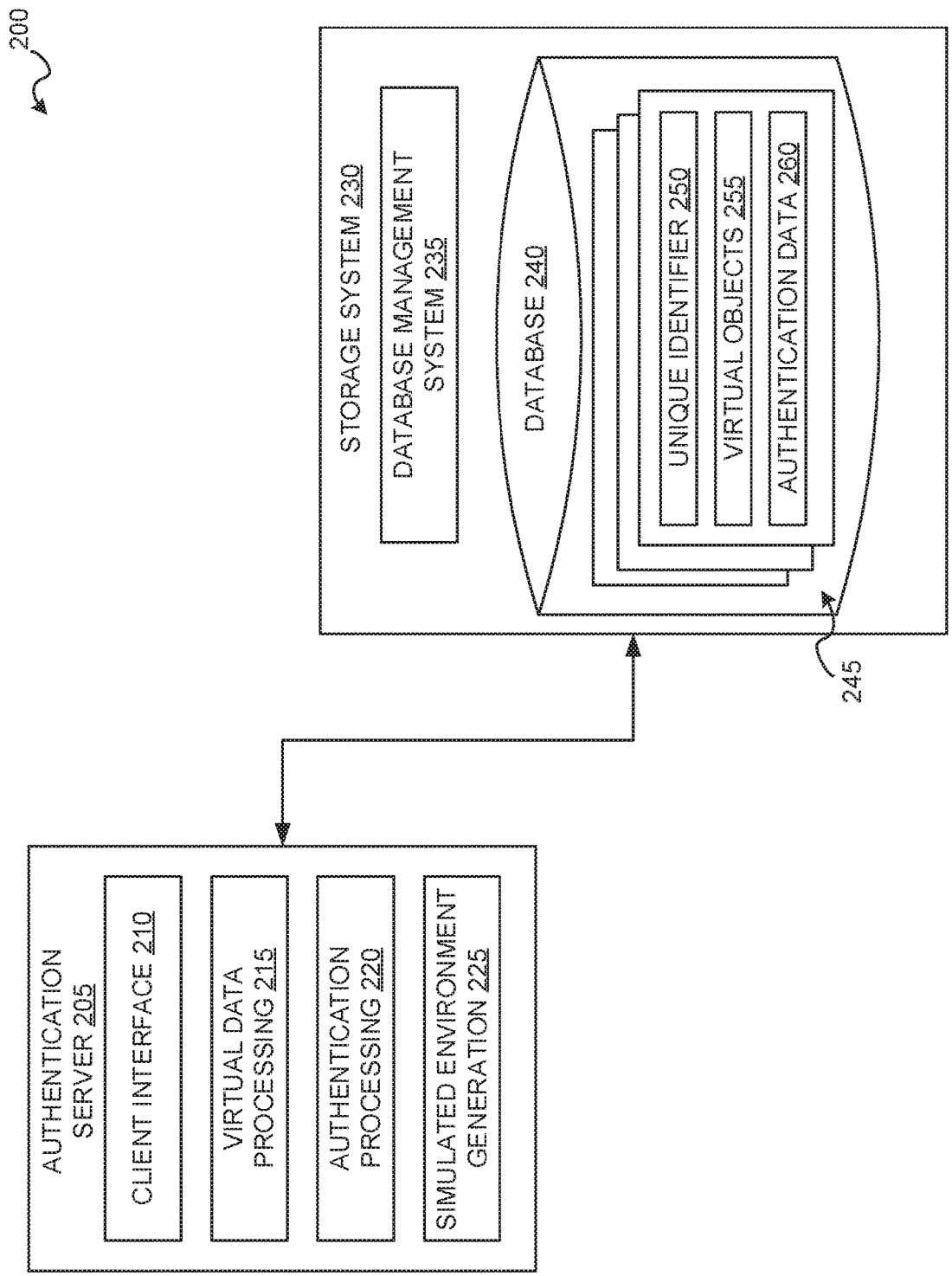
FIG. 2 is a diagram illustrating an example of an authentication system in a network-based system for controlling access, by a client computing device, to a computing server in an immersive simulated three-dimensional environment, according to various embodiments.

FIG. 2 is a diagram illustrating an example of an authentication system 200 in a network-based system 102 for controlling access, by a client device 110, to a computing server in an immersive simulated environment, according to various embodiments. The immersive simulated environment may include a virtual mall having one or more virtual locations (e.g., virtual shopping stores or virtual e-commerce sites) hosted by one or more disparate entities or organizations. The authentication system 200 may be an example of the authentication system 150, as shown in FIG. 1. The authentication system 200 may include one or more hardware circuits (e.g., accelerators, signal processors, microprocessors, and storage devices) and one or more software components (e.g., applications, scripts, modules, and other computer executable code) to authentication a client device 110 to a computer server 210, or a networked-based marketing system 102, without interrupting an immersive simulated environment experience of a user 106 operating the client device. In some embodiments, each virtual location in a virtual mall that is rendered in a immersive simulated environment may be associated with an authentication system 200. Each authentication system 200 may provide a different authentication experience or environment. The authentication system 200 may include an authentication server 205 and a storage system 230. The components or subcomponents of the authentication system 200 may communicate with each other, and with other systems, using one or more network-based (e.g., using a network interface card, or other communication bus) or inter-process-based communication techniques (e.g., shared memory, or software sockets).

The authentication server 205 may be a computing system (e.g., a server), such as a cloud computing system, having one or more processing circuits configured to interface with a client device 110 to provide an immersive simulated authentication environment. The authentication server 205 may include a client device interface 210, a virtual data processing component 215, an authentication processing component 220, and a simulated environment generation component 225.

The client device interface component 210 may include one or more hardware circuits or software components for communicating with a client computing device 110, such as through the mixed reality client 112. Such communicating may include receiving one or more request to access computing resources of the authentication server 205 or the networked-based marketing system 102. In some embodiments the computing resource access request may include a request to purchase an item offered for sale at a virtual location in an immersive simulated environment. In other embodiments, the request may include a request to update an existing account, a request to access previously stored account information, or a request to execute a restricted operation with respect the authentication system 200 or the network-based marketing system 102, or a request to receive or access another immersive simulated environment.

In some embodiments, a received request may include a unique identifier, such as to uniquely identify a client device 110, or a user associated with the client device, to the authentication system 200. The unique identifier may be a data object, such as an electronic token or symbol, that is received in a data structure, such as an electronic cookie. The unique identifier may have at least one numeric or symbolic value. In some embodiments, the unique identifier may be generated by a server hosting a virtual location in an immersive simulated environment and transmitted to a client device 110 during a registration or an account update process. The unique identifier may obviate the need for a client device 110, or a user of the client device, to generate or maintain other identification mechanisms, such as a username.

In some embodiments, the client interface 210 may receive authentication information from a client device 110, such as in response to a user interacting with an virtual object (e.g., an authentication object) within an authentication environment rendered by the client device 110. Such authentication information may include one or more data structures populated with virtual motion data. Such virtual motion data may indicate a virtual movement (e.g., gesture or other movement perceived by an observer viewing, or immersed in, an immersive simulated environment) of a virtual object relative to the authentication environment. A virtual movement may include a rotation, a translation, or any other operation to transform the position or orientation of a virtual object relative to an immersive simulated environment or relative to another virtual object in an immersive simulated environment. In some embodiments, the virtual motion data may indicate an initial position (e.g., using a three-element tuple corresponding to a coordinate in immersive simulated environment) or an orientation (e.g., an angle relative to a selected reference) of a virtual object. The virtual motion data may also indicate a virtual motion used to move a virtual object, such as an angle of rotation, a translation or rotation vector, matrix, or other function. The virtual motion data may also indicate a rate of change, such as a speed or an acceleration, of a virtual movement. In some embodiments, the virtual motion data may indicate a set of one or more virtual points traversed by a virtual object in an immersive simulated environment.

In certain embodiments, the client interface 210 may communicate with a client device 110 to transmit virtual objects, immersive simulated environments, and authorization messages. Such virtual objects and immersive simulated environments may enable the client device 110 to render an authentication environment with a look and feel that is prescribed the authentication system 200.

The virtual data processing component 215 may include one or more hardware circuits or software components for processing virtual motion data including in the authentication information received from a client device 110. Such processing may include analyzing the virtual motion data to extract patterns that may be indicative of one or more virtual movements of virtual objects. In some embodiments, the virtual motion data may be analyzed to identify the virtual objects associated with the virtual motion data. In an example, such identifying may include identifying a first virtual object and a second virtual object when the virtual motion data indicates that the first object is moved relative to a second object. The analysis may further include determining an initial state, such as a position or orientation in an immersive simulated environment, of the identified virtual objects before a virtual motion indicated in the virtual motion data was generated. The analysis may also include determining a final state of the identified virtual objects after a virtual motion indicated in the virtual motion data is generated. In an example, the virtual data processing component 215 may determine, using the virtual motion data, that an identified virtual object was translated from a first location in an immersive simulated environment (e.g., an initial state) to a second location (e.g., a final state).

The virtual data processing component 215 may process the virtual motion data to determine a trajectory (e.g., a virtual trajectory) of an identified virtual object as the identified virtual object are transformed from the initial state to the final state. Such trajectory may include, among other things, a route traversed by the identified virtual object, as well as the speed (e.g., a virtual speed), acceleration (e.g., a virtual acceleration), and orientation of the identified object as it is transformed from the initial state to the final state.

In some embodiments, the virtual data processing component 215 may quantize the virtual motion data, such as to remove noise and to enable reliable comparison between virtual motion data received from the client device 110 and previously stored virtual motion data. In some embodiments, the virtual data processing component 215 may quantize the virtual motion data, or data representing the patterns extracted from the virtual motion data, by reducing the resolution or precision of the data, such as to cause the data to have a precision within a specified tolerance. In an example, position or trajectory data extracted from the virtual motion data may be quantized by restricting, or rounding, coordinates to vertices on a grid, where the resolution of the grid is selected to provide a desired tolerance or margin of error between close coordinates.

The authentication processing component 220 may include one or more hardware circuits or software components for processing an authentication request received from a client device 110. Such processing may include receiving, such as from the client interface 210, a unique identifier associated with a client device 110 and using the unique identifier to query a storage system, such as the storage system 230 (e.g., a cloud base storage system), to retrieve stored authentication information 245 associated with the client device. The stored authentication information 245 may include a stored unique identifier 250, one or more virtual objects 255, and client authentication data 260. In some embodiments, the stored unique identifier 250 may be an index of a record in a database 240. In these embodiments, a database management system 235 may map the unique identifier received by from the client device 110 to such an index.

The one or more virtual objects 255 may include any simulated object that may be manipulated by virtual motions of a user of a client device 110 while the user is immersed in an immersive simulated environment, such as provide authentication information to the authentication system 200. Such simulated objects may include a simulated probe (e.g., a pointing device), a simulated character or symbol input device (e.g., a simulated keyboard, keypad, or pattern device), a simulated geometric or organic shape, an image, or simulated models of other physical objects. In certain embodiments, such simulated models may include a simulated appendage of a user 106, such as an arm, hand, or finger of the user. In other embodiments the one or more virtual objects 255 may include a virtual object that is custom generated by a user 106, such a symbol input device that populated by characters that are arranged in a custom sequence or pattern. In some embodiments, the one or more virtual objects 255 may be preselected by a user 106 and stored in the database 240, such as during the registration or the updating of an account associated with the user or the client device 110.

In some embodiments, the one or more virtual objects 255 may be stored as a reference (e.g., a key or other identifier) to one or more virtual objects stored in a database available to the authentication server 200 or to the client device 110. In certain embodiments, the one or more virtual objects 255 may be stored as a data structure comprising one or more raw 3D geometric models, such as geometric mesh or polygonal model. In other embodiments, the one or more models 255 may be stored as one or more pre-rendered 3D objects, such as a set of one or more images depicting one or more facets of the one or more pre-rendered 3D objects 255.

The client authentication data 260 may include one or more patterns embodied in, or extracted from, virtual motion data received from a client device 110, or from another source, such as during the registration or the updating of an account associated with a user 106 or the client device. A pattern may a set of one or more virtual movements of one or more virtual objects 255 relative an immersive simulated environment, or relative to another virtual object in an immersive simulated environment. In an example, when the one or more virtual objects 255 includes a virtual basketball, a pattern stored in the authentication data 260 may include a trajectory of the virtual basketball when a user 106 virtually shoots or throws the virtual basketball from location in an immersive simulated environment. In another example, when the one or more virtual objects 255 include a virtual keyboard (e.g., a character input object), a pattern stored in the authentication data 260 may include a trajectory of a virtual probe as the virtual probe is used to virtually select or type one or more keys or characters on the virtual keyboard. In this example, the pattern may also include the sequence in which the keys or characters are selected on the virtual keyboard. In another example, when the virtual objects 255 include a palette of one or more simulated shapes, that pattern stored in the authentication data 260 may include a particular arrangement of, or a pattern formed by, a selection of the simulated shapes in the immersive simulated environment, or a trajectory of simulated shapes as they are arranged in a pattern in the immersive simulated environment.

Returning to the authentication processing component 220, processing an authentication request may further include transmitting the one or more virtual objects 255 along with an immersive simulated environment, such as an immersive simulated environment generated by the simulated environment generation component 255, to the client device 110. Such transmitting may include transmitting a data structure including references to one or more virtual objects and a set of directives for rendering the one or more virtual objects, such as to generate a mixed reality authentication environment on a client device 110. Such transmitting may also include transmitting a data structure including one or more raw 3D geometric models or one or more pre-rendered 3D models along with a set of directives for rendering the models on the client device 110, such as to generate a mixed reality authentication environment.

Processing an authentication request may further include receiving authentication information, such as quantized virtual motion data, from the client device 110 and comparing the received authentication information to the virtual objects 255 and to the client authentication data 260. Such comparing may include determining whether virtual objects associated with virtual motion data extracted from the received authentication information match the one or more virtual objects 255. Such comparing may also include determining whether patterns extracted from the virtual motion data in the received authentication information match, within a margin of error associated by the quantization of the virtual motion data, patterns included in the client authentication data 260. The authentication processing component 220 may transmit an authorization message to a client device 110 after determining that the received authentication information matches the client authentication data 260. The authorization message may enable the client device 110 to access a resource of the network-based computing system 102.

The simulated environment generation component 225 may include one or more hardware circuits or software components for generating an immersive simulated authentication environment. In some embodiments, the authentication environment may be generated to have a look and feel (e.g., an authentication experience) determined by a computing system (e.g., the network-based system 102) that hosts a virtual location. In other embodiments, the authentication environment may be generated to have a look and feel specified by a user 106 or a client device 110. In these embodiments, the look and feel authentication environment may be indicated by the stored authentication information 245, such as by one or more authentication environment parameter included in the stored authentication information 245.

Generating an immersive simulated authentication environment may include populating a data structure, such as a file, with one or more simulated environment primitives (e.g., references to virtual objects accessible to the client device 110) along with a set of one or more directives prescribing how to render and arrange the simulate environment primitives on a client device 110. In other embodiments, generating an immersive simulated authentication environment may include populating a data structure, such as a file, one or more raw 3D models or one or more pre-rendered 3D models along with a set of one or more directives prescribing how to render and arrange the models on a client device 110. The data structure, and the data used to populate the data structure, may adhere a standardized data structure format for defining or providing immersive simulated environments, such as increase interoperability between disparate virtual location host computing systems and client devices 110. In some embodiments, an immersive simulated authentication environment may be generated by the simulated environment generation component 225 after the authentication system 200 receives a request to access a computing system resource, as described herein. Accordingly, an immersive simulated authentication environment may be changed or updated for all client devices at the authentication server 200.

Figure 3:
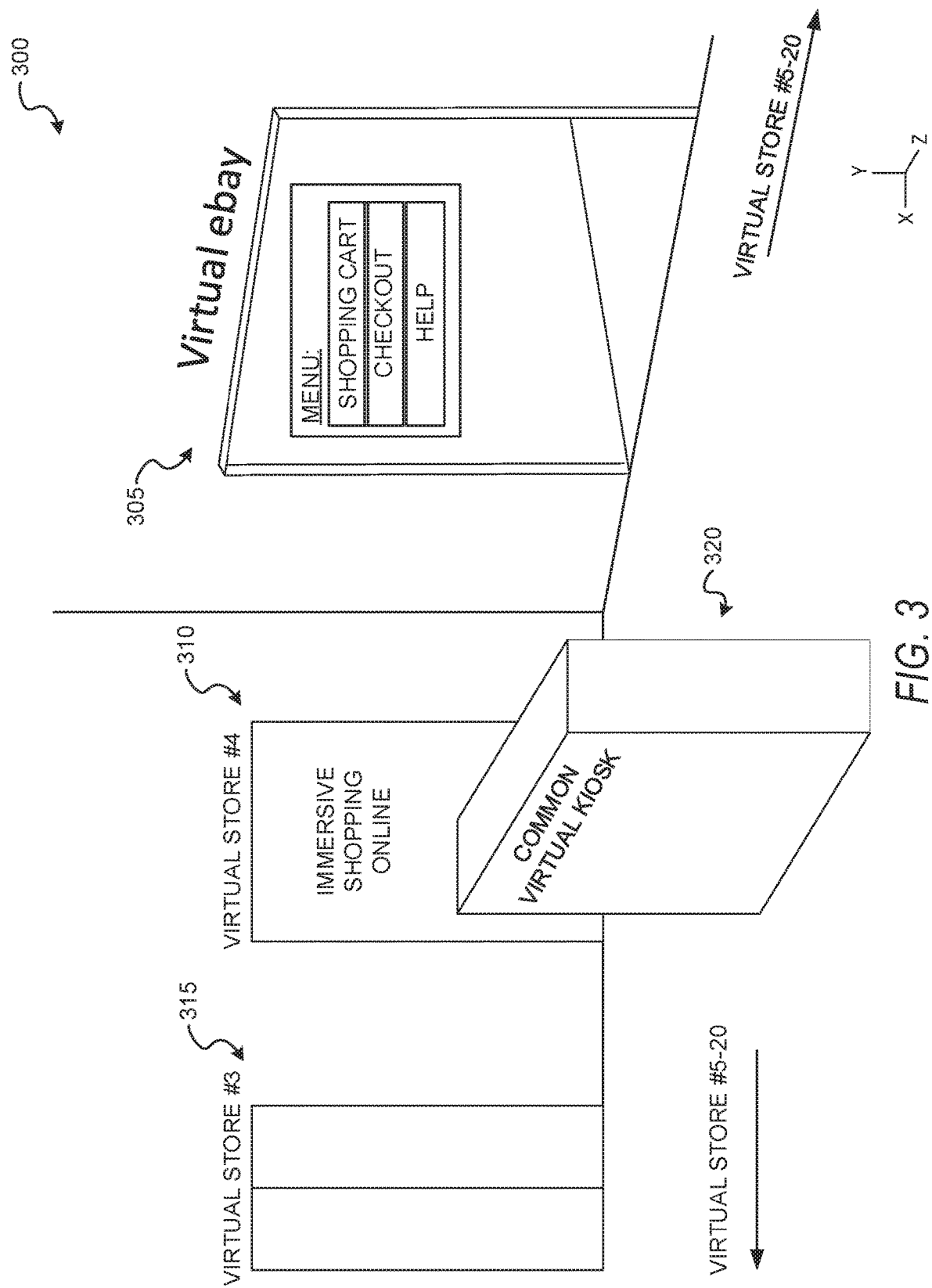
FIG. 3 depicts an example of a virtual mall in an immersive simulated three-dimensional environment where a user may authenticate a client device at one or more virtual locations, according to various embodiments.

FIG. 3 depicts an example of a virtual mall 300 in an immersive simulated environment where a user may authenticate a client device at one or more virtual locations 305, 310, 315, and 320, according to various embodiments. The virtual mall 300 may be mixed reality analog of a web browser. A user 106 of a mixed reality device, such as the client device 110, may virtually move from one virtual location to another virtual location within an immersive simulated environment, such as to browse and purchase items offered at each virtual location. This may be similar to a user moving between network-based market places in a web browser by changing universal resource locator (URL) addresses or by switching between tabs displaying different e-commerce sites. Each virtual location may be hosted by a computing system, such as the network-based marketing system 102. Accordingly, the authentication techniques of the present disclosure may enable a mixed reality device to authentic itself or a user of the mixed reality device to the network-based marketing system hosting each virtual location without interrupting the immersive simulated environment experience.

In an example, a user may establish accounts with one or more of the virtual locations 305, 310, 315, and 320. During an account registration process, the one or more virtual locations may store a unique identifier on the mixed reality device of the user. In some embodiments, the unique identifier may be store an electronic cookie or other data structure on the mixed reality device. When a user visits a first virtual location, such as the virtual eBay 305, and a requests access to a computing resource offered by the first virtual location, the unique identifier for first location may automatically be transmitted a computing system hosting the first virtual location. In some embodiments, the computing resource may be entry of access to the virtual location, so as to cause the unique identifier (e.g., the electronic cookie) may be automatically transmitted a host computing system when a user approaches or enters the virtual location. The computing system hosting the first virtual location may then transmit an authentication environment to the mixed reality device of the user. In some embodiments, the authentication environment may be configured to provide a look and feel that is unique to the first virtual location. A user may initiate another authentication process at a second virtual location by virtually moving to the second virtual location and requesting a resource of the host computing system. The second virtual location may provide, in response to such a request, another authentication experience that may be configured to provide a look and feel that is unique to the second virtual location. The second virtual location may accomplish a different look and feel by storing a different authentication environment or different authentication objects, and sending a second different unique identifier to the client device to store in association with the different authentication environment or authentication objects. The second different unique identifier may be transmitted by the client when authenticating to the second virtual location.

In some embodiments, a user may request access to a computing resource of one or more virtual locations from a common location, such as the common virtual kiosk 320, in the virtual mall 300 that is separate from the one or more virtual locations. In these embodiments, a user may initiate an authentication process manually by selecting and transmitting an appropriate unique identifier in a computing resource or authentication request to a computing system hosting the common virtual location. In some embodiments, the computing system hosting the common virtual location may facilitate the authentication process by forwarding the request to the appropriate virtual location host computing system. In some embodiments, a computing system hosting one or more of the virtual locations 305, 310, or 315 may detect that the user is located at a common location and may adjust the authentication environment transmitted the user based on the common location. In an example, a computing system hosting one or more of the virtual locations 305, 310, or 315 may adjust the mixed reality authentication environment to have a different resolution, different virtual objects, or a different level of security.

Figure 4:
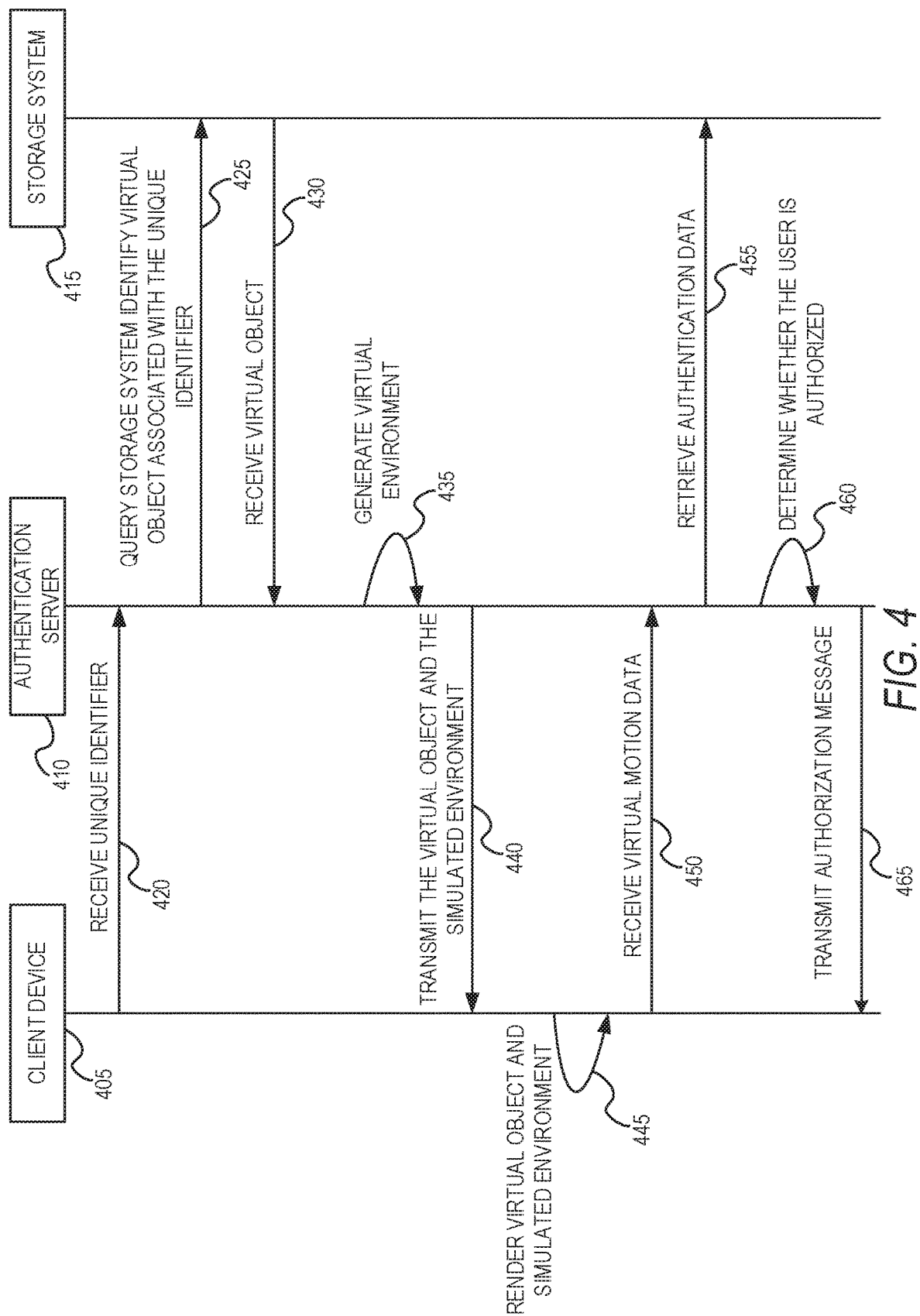
FIG. 4 illustrates a diagram showing an example of interactions between computing systems in network-based system for controlling access, by a client device, to a computing server in an immersive simulated three-dimensional environment, according to various embodiments.

FIG. 4 illustrates a diagram showing an example of interactions between computing systems in network-based system for controlling access, by a client device (e.g., a mixed reality device), at a computing server in an immersive simulated environment, according to various embodiments.

The diagram includes a client device 405, an authentication server 410, and a storage system 415, which may correspond, respectively, to the client device 110 (FIG. 1), the authentication server 205 (FIG. 2), and the storage system 230 (FIG. 2). As shown in the FIG. 4, a request to authenticate the client device 405 at the authentication server 410 may be initiated at 420 when the authentication system receives a message, such as over a data communication network, including a unique identifier, such as part of a request to access a computing resource of the authentication system or a networked-based system, such as a network-based market place 102. At 425, the authentication server may use unique identifier to query the storage system 415 to identify authentication information including, a virtual object, associated with the unique identifier. At 430, the authentication server 410 may receive stored authentication information associated with the client device 405, including a virtual object, from the storage system 415. A 435, the authentication server 410 may generate an authentication environment for receiving authentication from the client device 405. In some embodiments, the authentication environment may be generated based on the stored authentication information. At 440, the authentication server 410 may transmit a virtual object and an authentication environment to the client device 405. At 445, the client device 405 may render a virtual object and an authentication environment received from the authentication server 410, such as on a display of a virtual reality headset. At 450, the authentication server 410 may receive authentication information including virtual motion data from the client device 405. In some embodiments, the authentication server 410 may retrieve, from the storage system 415, authentication data to compare with the received authentication information. At operation 460, the authentication server 410 may extract one more patterns from the authentication information and compare the extracted patterns to previously provided patterns associated with the authentication data to determine whether the client device 405, or a user of the client device, is authorized to access a computing resource of authentication server 410 or the network-based system 102. At 465, the authentication system may transmit an authorization message to the client device 405, such as to grant the client device access to resource of the authentication server 410 or network-based system 102.

Figure 5:
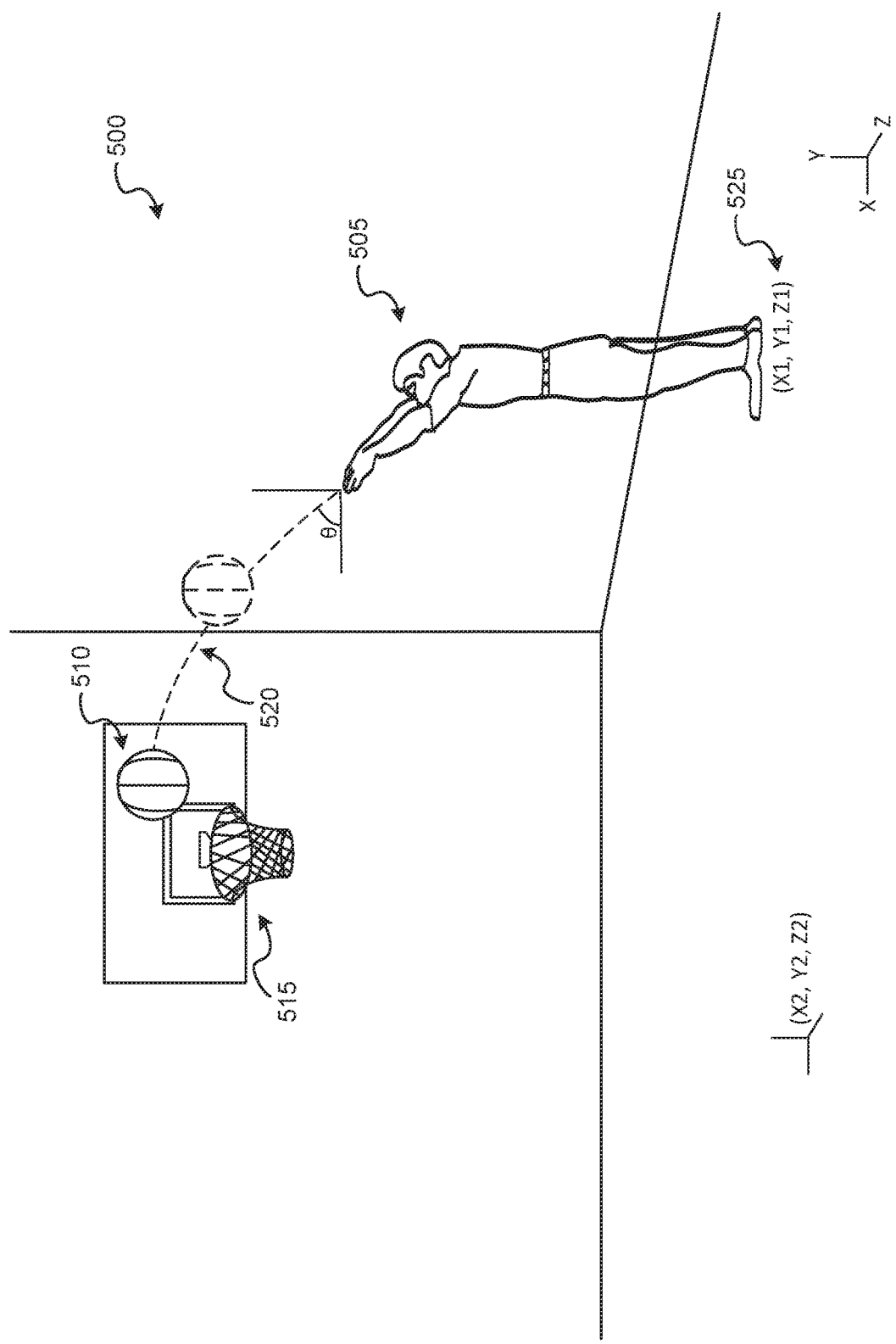
FIG. 5 is a diagram of an example of a user authenticating a mixed reality dive in an immersive simulated three-dimensional environment, according to various embodiments, according to various embodiments.

FIG. 5 is a diagram of an example of a user authenticating a mixed reality device in an immersive simulated environment 500, according to various embodiments. FIG. 5 depicts the immersive simulated environment 500 from the perspective of a third-party observer, so as to show a user 505 of a client device, such as a mixed reality device, performing a gesture with respect to virtual objects 520 and 525 to authenticate the mixed reality device to a server. The mixed reality device may be an example of the client device 110, while the server may be an example of the network-based system 102. The immersive simulated environment 500 may be an authentication environment received from an authentication server, such as the authentication server 205, in response to a request from the mixed reality device to access a computing resource of server. The gesture may include the user 505 shooting a virtual basketball 510 (e.g., a virtual object) into a virtual basketball hoop 515. In some embodiments, the gesture may be recorded by the mixed reality device and transmitted to the authentication server as authentication information for authenticating the mixed reality device. In some embodiments, the authentication information may include a trajectory 520 of the virtual basketball 510. The trajectory may include an angle θ at which the user 505 shoots the virtual basketball, a speed of the virtual basketball, and a path that the virtual basket travels through the immersive simulated environment 500 from the user 505 to the virtual basketball hoop 515. In some embodiments, the authentication information may also include the location 525 of the user 505 in the immersive simulated environment when he shoots the virtual basketball 510.

Although FIG. 5 depicts the gesture of shooting a virtual basketball 510 into the virtual basketball hoop 515, other gestures may be used to generate the authentication information described in relation to FIG. 5. Examples of such gestures may include kicking a virtual soccer ball towards a virtual goal or other virtual object and throwing a virtual ball or other virtual object at a virtual target.

Figure 6:
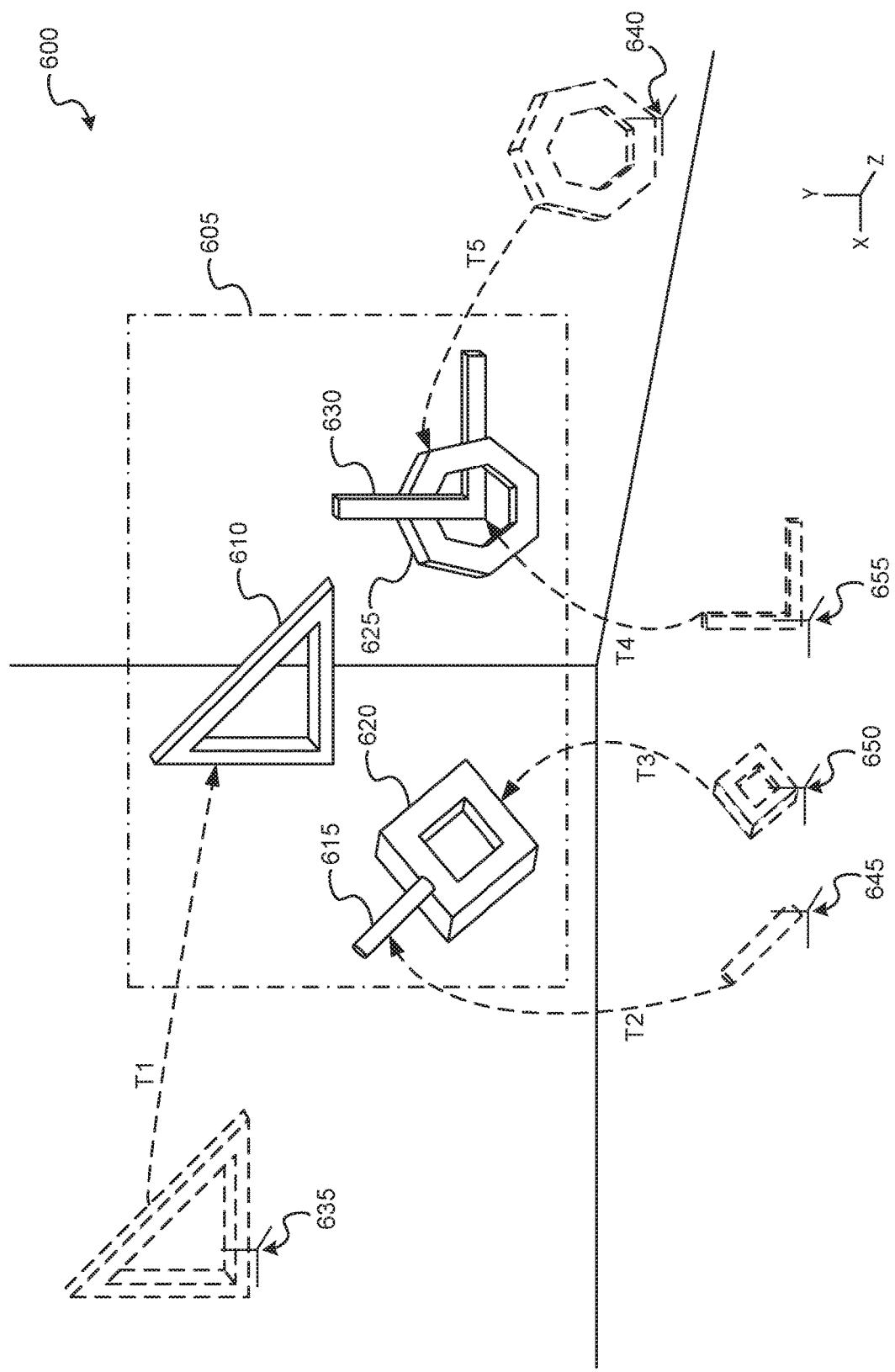
FIG. 6 is a diagram of an example of a user authenticating a mixed reality device in an immersive simulated three-dimensional environment, according to various embodiments.

FIG. 6 is a diagram of an example of a user authenticating a mixed reality device in an immersive simulated environment, according to various embodiments. FIG. 6 depicts the immersive simulated environment 600 from the perspective of a user of the mixed reality device, such as to indicate a set of gestures for authenticating the mixed reality device by virtually arranging a set of virtual geometric shapes 610, 615, 620, 625, and 630 in an area 605 of an immersive simulated environment. The immersive simulated environment 600 may be a mixed reality authentication environment received from an authentication server, such as the authentication server 205, in response to a request from the mixed reality device to access a resource of a computing system, such as the network-based market place 102, associated with the authentication server 205. The set of gestures may include a user virtually moving the virtual geometric shapes 610, 615, 620, 625, and 630 from a location 635, 645, 650, 640, and 655, respectively, to form a particular arrangement in the area 605. In some embodiments, the set of gestures may be recorded by the mixed reality device and transmitted to the authentication server as authentication information for authenticating the mixed reality device. The authentication information may include the initial position of each virtual geometric shape, the trajectory T1, T2, T3, T4, and T4, of the geometric shapes as they are moved through the immersive simulated environment 600, a pattern formed by the arrangement of virtual geometric shapes in the area 605, and the position or orientation of each virtual geometric shape with respect to each virtual geometric shape and to the area 605.

Although FIG. 6 depicts a set of gestures for arranging the virtual geometric shapes 610, 615, 620, 625, and 630 in the area 605, other virtual shapes may be used. In some embodiments, the area 605 may include an image or a large virtual object. In these embodiments, the authentication information generated from a set of user gestures may include an arrangement of virtual shapes on such an image or the large virtual object.

Figure 7:
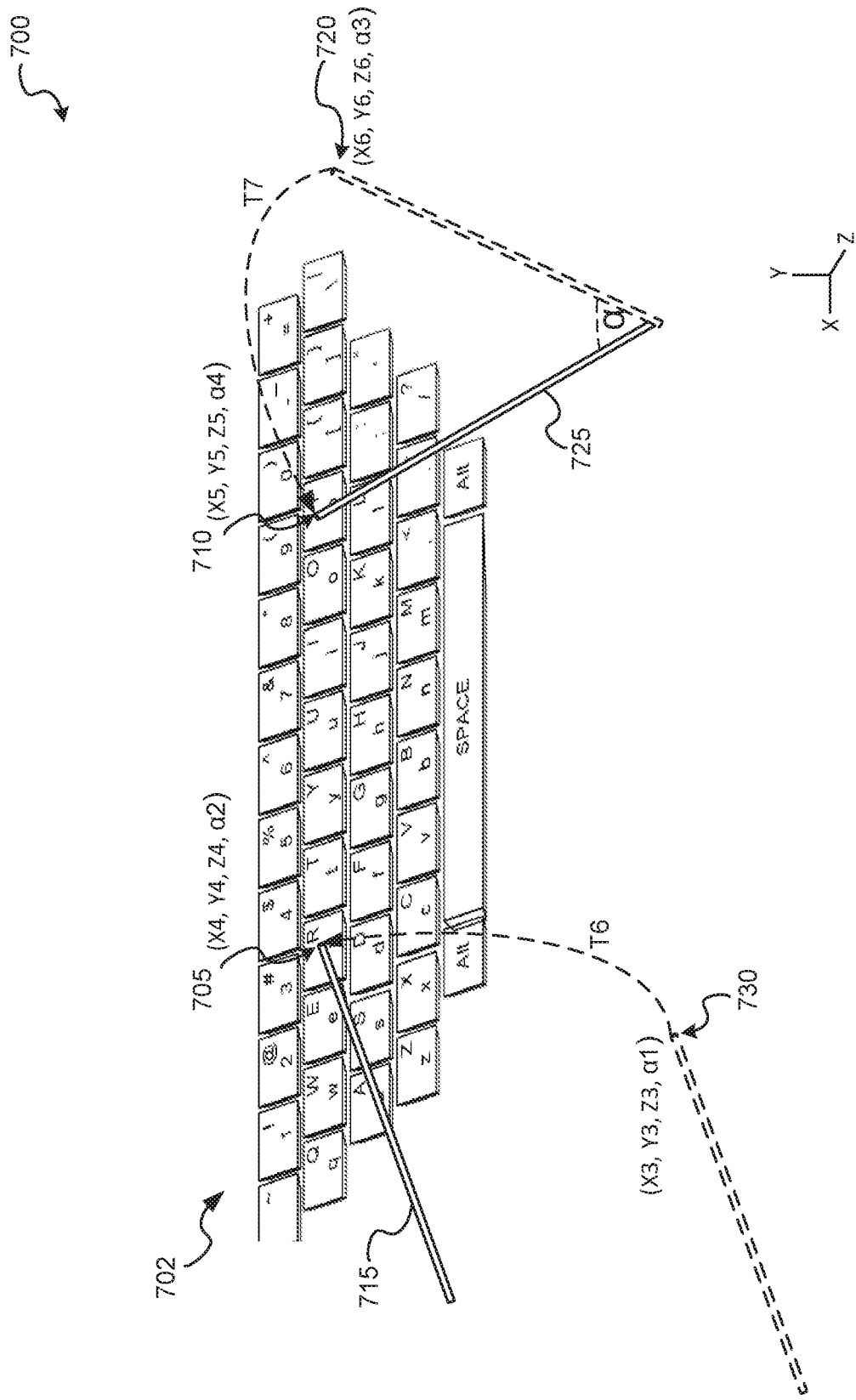
FIG. 7 is a diagram of an example of a user authenticating a mixed reality device in an immersive simulated three-dimensional environment, according to various embodiments.

FIG. 7 is a diagram of an example of a user authenticating a mixed reality device in an immersive simulated environment 700, according to various embodiments. FIG. 7 depicts the immersive simulated environment 700 from the perspective of a user of the mixed reality device, such as to indicate a set of gestures for authenticating the mixed reality device by virtually selecting a sequence of characters from a virtual keyboard 702. The immersive simulated environment may be a mixed reality authentication environment received from an authentication server, such as the authentication server 205, in response to a request from the mixed reality device to access a resource of a computing system, such as the network-based market place 102, associated with the authentication server 205. The set of gestures may include a user moving a set of virtual probes 715 and 725 from an initial position 730 and 720, along a trajectory T6 and T7 to virtual positions 705 and 710 on the virtual keyboard 702, such as to select one or more characters on the virtual keyboard. In some embodiments, the set of gestures may be recorded by the mixed reality device and transmitted to the authentication server as authentication information for authenticating the mixed reality device. The authentication information may include the initial position of each virtual probe 715 and 725, the trajectory T6 and T7 of the virtual probes 715 and 725 as they are moved by a user of the mixed reality device to select a sequence of characters on the virtual keyboard 702. The authentication information may also include the sequence of characters selected using the virtual probes 715 and 725. The authentication information may further include the virtual position and orientations, such as indicated by the tuples of 3D coordinates and angular orientations associated with the virtual positions 705 and 710, for the virtual probes 715 and 725. In some embodiments, the authentication information may include an orientation or a virtual position of the virtual keyboard 702.

Although FIG. 7 depicts a virtual keyboard 702 and virtual probes 715 and 725, other virtual objects may be used to generate authentication information for authenticating a mixed reality device according to the technique depicted in FIG. 7. In an example, the a customized or randomly generated pattern input device may be used instead the virtual keyboard 702, while a virtual model of the hand or finger of a user may be used instead of the set of probes 715 and 725.

Figure 8:
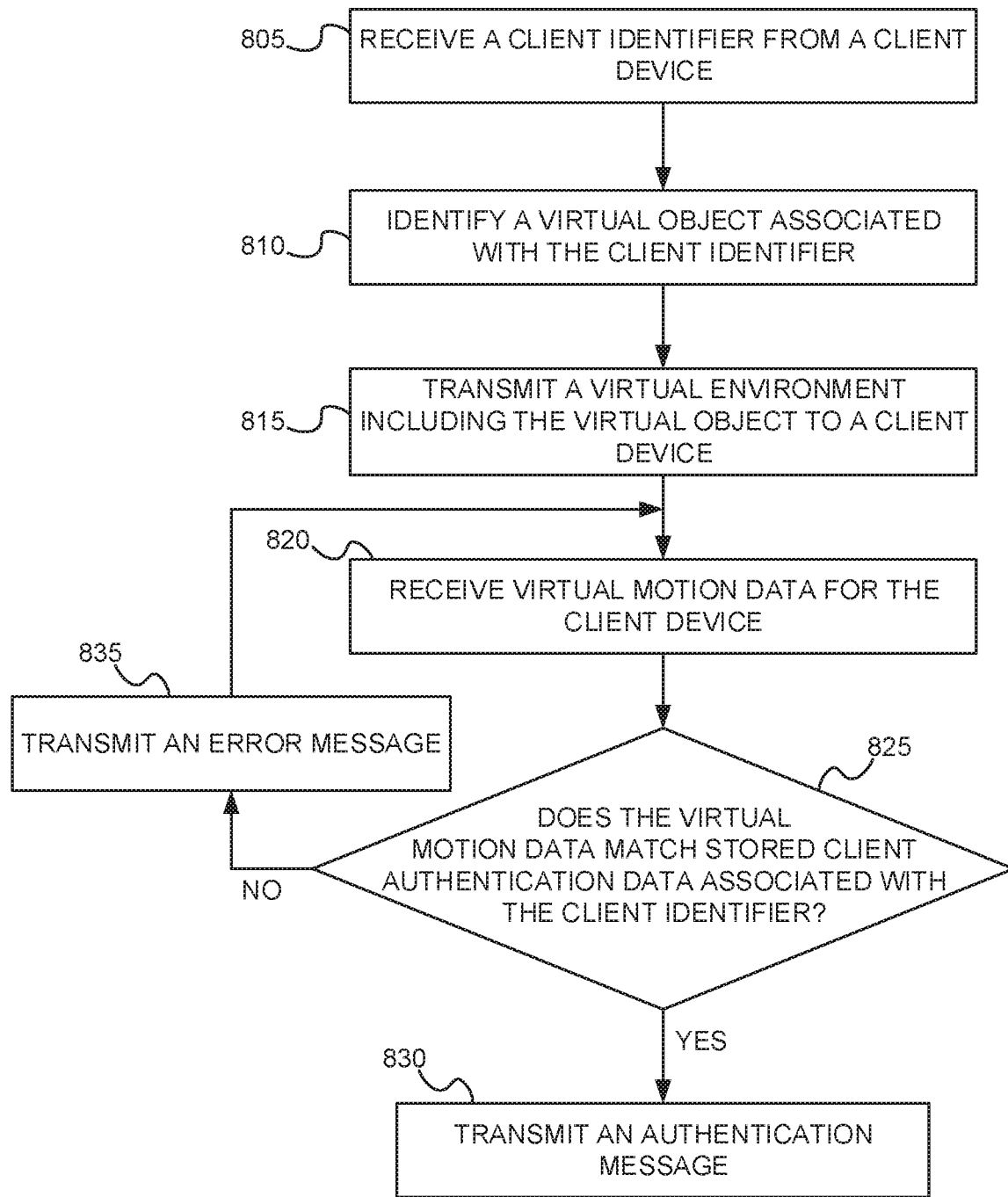
FIG. 8 is a diagram of a process 800 for operating network-based system for controlling access, by a client device, to a computing server in an immersive simulated three-dimensional environment, according to various embodiments.

FIG. 8 is a diagram of a process 800 for operating network-based system for controlling access, by a client device, to a computing server in an immersive simulated environment, according to various embodiments. The process 800 may be executed by a computing system, such as the authentication system 200, in response to a request from a client device to access a protected or restricted resource of the computing system.

At 805, a client identifier may be received from a client device. The client identifier may be received in a data structure, such as a cookie, that is automatically transmitted for a client device, such as in a request from a client device to access a computing resource (e.g., a protected or restricted computing resource). Such a data structure may include the client identifier and one or more data objects indicating, for example, user selected preferences for authenticating the client device or for interacting with an authenticating computing system. The client identifier may include a unique identifier associated with a stored record having previously provided authentication data for the client device. Such authentication data may include a virtual object and virtual motion data, or virtual gesture patterns extracted from virtual motion data.

At 810, the client identifier may be used to identify a virtual object stored in a record associated with the client device. As described herein, the virtual object may be any simulated object that may be manipulated or moved in an immersive simulated environment to generate authentication information.

At 815, a virtual environment, including the virtual object, may be transmitted to the client device. In some embodiments, the virtual environment may be standard immersive simulated authentication environment, such as to create a standard look and feel of an authentication experience. In other embodiments, the virtual environment may be custom generated authentication environment, such as to customize the look and feel of an authentication experience to a user or a client device.

In some embodiments, an identifier of a virtual location may be received from the client device. In these embodiments, the received virtual location identifier may be used to identify a virtual object or to generate a virtual environment.

At 820, authentication information, including virtual motion data, may be received from a client device. In some embodiments, the authentication information may be automatically received from the client device in response to a user performing one or more gestures with respect a virtual object in the authentication environment. Such gestures may include moving, rotating, or otherwise manipulating a virtual object. In some embodiments, the client device may record and process the gestures to extract patterns of movements which may be included in the authentication information. In certain embodiments, such processing may include quantizing or filtering the information associated with the gestures, such as trajectories, angular rotations, coordinate points, etc.

At 825, it may be determined whether the virtual motion data, or the gesture patterns extracted from the virtual motion data, match stored authentication data associated with the client device (e.g., associated with the client identifier received at 805). At 830, an authentication message may be transmitted to the client device when the virtual motion data, or gesture patterns extracted from the virtual motion data, matches stored authentication data associated with the client device. At 835, an error message may be transmitted to the client device when the virtual motion data, or gesture patterns extracted from the virtual motion data, does not match stored authentication data associated with the client device.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 9:
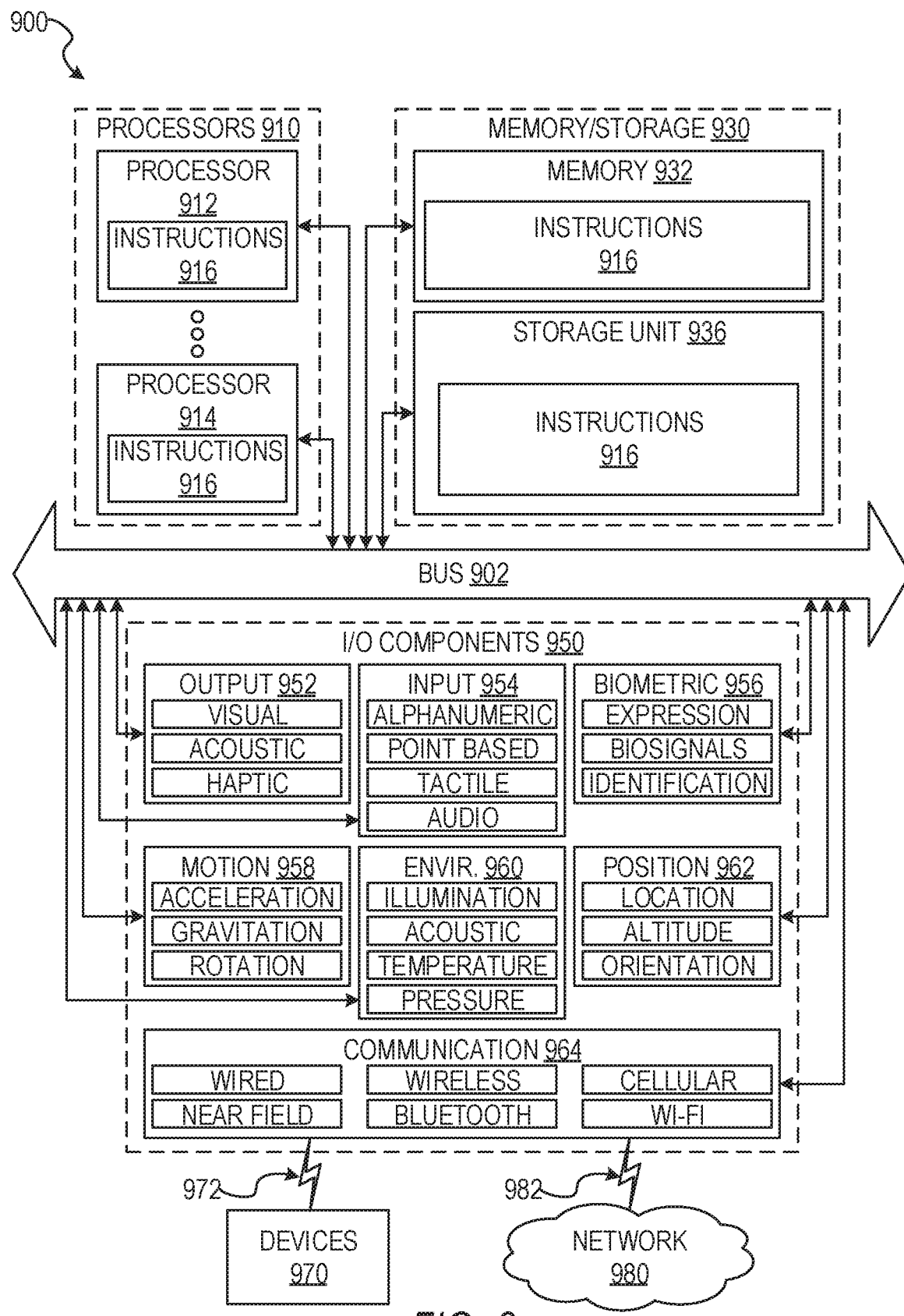
FIG. 9 illustrates a diagrammatic representation of a machine in the form of a computer system within which a set of instructions may be executed for causing the machine to perform any one or more of the methodologies discussed herein, according to various embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions may cause the machine to execute the flow diagram of FIG. 8. The instructions transform the general, non-programmed machine into a particular machine programmed to carry out the described and illustrated functions in the manner described. In alternative embodiments, the machine 900 may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

In some embodiments, the instructions 916 may include software applications and associated processes such applications 112, 114, 120, and 122, as well as for software based components of the authentication server 205 and the database management system 235.

1 The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system, comprising:
one or more servers having one or more processing circuits and a non-transitory storage medium, the non-transitory storage medium having computer code that is executable by the one or more processing circuits to cause the system to:
receive location information identifying a virtual location within a virtual environment;
identify a virtual object and a three-dimensional authentication environment based on the location information;
transmit, to a user device, the virtual object and the three-dimensional authentication environment;
receive, from the user device, virtual motion data indicating movement of the virtual object relative to the three-dimensional authentication environment;
compare the movement of the virtual object relative to the three-dimensional authentication environment from the virtual motion data with a pattern of virtual motion data; and
determine, based on the comparison, that the user device is authorized to access a resource.

2. The system of claim 1, wherein the system is further caused to:
extract an additional pattern of virtual motion data from the received virtual motion data.

3. The system of claim 2, wherein the extracting the additional pattern of virtual motion data further comprises quantizing at least one of a trajectory of the virtual object, angular rotation of the virtual object, or coordinate points of the virtual object.

4. The system of claim 1, wherein the pattern of virtual motion data comprises virtual motion data of the virtual object being moved from a location within the three-dimensional authentication environment.

5. The system of claim 1, wherein the pattern of virtual motion data comprises virtual motion data representing a sequence of virtual movements of the virtual object performed in an order.

6. The system of claim 1, wherein the three-dimensional authentication environment comprises a plurality of virtual objects, and wherein the pattern of virtual motion data comprises virtual motion data representing an arrangement of the plurality of virtual objects relative to each other in the three-dimensional authentication environment.

7. The system of claim 6, wherein the pattern of virtual motion data comprises virtual motion data representing the plurality of virtual objects being arranged relative to one or more areas of the three-dimensional authentication environment.

8. The system of claim 6, wherein the virtual motion data representing the arrangement of the plurality of virtual objects comprises at least one of an orientation of each virtual object or a position of each virtual object.

9. One or more non-transitory machine-readable media storing computer-useable instructions that, when used by one or more computing devices, cause the one or more computing devices to perform operations, the operations comprising:
receiving location information identifying a virtual location within a virtual environment;
identifying a virtual object and a three-dimensional authentication environment based on the location information;
transmitting, to a user device, the virtual object and the three-dimensional authentication environment;
receiving, from the user device, virtual motion data indicating movement of the virtual object relative to the three-dimensional authentication environment;
comparing the movement of the virtual object relative to the three-dimensional authentication environment from the virtual motion data with a pattern of virtual motion data; and
determining, based on the comparison, that the user device is authorized to access a resource.

10. The one or more non-transitory machine-readable media of claim 9, wherein the operations further comprise:
extracting an additional pattern of virtual motion data from the received virtual motion data.

11. The one or more non-transitory machine-readable media of claim 9, wherein the pattern of virtual motion data comprises virtual motion data of the virtual object being moved from a location within the three-dimensional authentication environment.

12. The one or more non-transitory machine-readable media of claim 9, wherein the pattern of virtual motion data comprises virtual motion data representing a sequence of virtual movements of the virtual object performed in an order.

13. The one or more non-transitory machine-readable media of claim 9, wherein the three-dimensional authentication environment comprises a plurality of virtual objects, and wherein the pattern of virtual motion data comprises virtual motion data representing an arrangement of the plurality of virtual objects relative to each other in the three-dimensional authentication environment.

14. The one or more non-transitory machine-readable media of claim 13, wherein the pattern of virtual motion data comprises virtual motion data representing the plurality of virtual objects being arranged relative to one or more areas of the three-dimensional authentication environment.

15. The one or more non-transitory machine-readable media of claim 13, wherein the virtual motion data representing the arrangement of the plurality of virtual objects comprises at least one of an orientation of each virtual object or a position of each virtual object.

16. A computer-implemented method comprising:
receiving location information identifying a virtual location within a virtual environment;
identifying a virtual object and a three-dimensional authentication environment based on the location information;
transmitting, to a user device, the virtual object and the three-dimensional authentication environment;
receiving, from the user device, virtual motion data indicating movement of the virtual object relative to the three-dimensional authentication environment;
comparing the movement of the virtual object relative to the three-dimensional authentication environment from the virtual motion data with a pattern of virtual motion data; and
determining, based on the comparison, that the user device is authorized to access a resource.

17. The method of claim 16, wherein the three-dimensional authentication environment comprises a plurality of virtual objects, and wherein the pattern of virtual motion data comprises virtual motion data representing an arrangement of the plurality of virtual objects relative to each other in the three-dimensional authentication environment.

18. The method of claim 17, wherein the pattern of virtual motion data comprises virtual motion data representing the plurality of virtual objects being arranged relative to one or more areas of the three-dimensional authentication environment.

19. The method of claim 17, wherein the virtual motion data representing the arrangement of the plurality of virtual objects comprises at least one of an orientation of each virtual object or a position of each virtual object.

20. The method of claim 16, wherein the pattern of virtual motion data comprises virtual motion data representing a sequence of virtual movements of the virtual object performed in an order.

* * * * *